United States Patent
Takamiya

(10) Patent No.: US 9,800,587 B2
(45) Date of Patent: Oct. 24, 2017

(54) IMAGE PROCESSING APPARATUS, METHOD FOR CONTROLLING IMAGE PROCESSING APPARATUS, AND STORAGE MEDIUM

(71) Applicant: CANON KABUSHIKI KAISHA, Tokyo (JP)

(72) Inventor: Hiroyoshi Takamiya, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 111 days.

(21) Appl. No.: 14/817,060

(22) Filed: Aug. 3, 2015

(65) Prior Publication Data

US 2016/0044044 A1 Feb. 11, 2016

(30) Foreign Application Priority Data

Aug. 7, 2014 (JP) .................................. 2014-161623

(51) Int. Cl.
 H04L 29/06 (2006.01)
 G06F 21/60 (2013.01)

(52) U.S. Cl.
 CPC .......... H04L 63/105 (2013.01); G06F 21/608 (2013.01); H04L 63/08 (2013.01); H04L 63/083 (2013.01); H04L 63/10 (2013.01); H04L 63/104 (2013.01)

(58) Field of Classification Search
 CPC ....... H04L 63/08; H04L 63/10; H04L 63/083; H04L 63/105; H04L 63/104; G06F 21/608
 See application file for complete search history.

(56) References Cited

U.S. PATENT DOCUMENTS

| | | | | |
|---|---|---|---|---|
| 6,144,959 A * | 11/2000 | Anderson | ............... | G06F 21/31 |
| 7,249,900 B1 * | 7/2007 | Katano | ................. | G06F 3/1222 |
| | | | | 358/1.15 |
| 8,842,312 B2 * | 9/2014 | Lao | ........................ | G06F 3/1205 |
| | | | | 358/1.1 |
| 2005/0073709 A1 * | 4/2005 | Kujirai | .................. | G06F 3/1222 |
| | | | | 358/1.14 |
| 2005/0172151 A1 * | 8/2005 | Kodimer | ................. | G06F 21/31 |
| | | | | 726/5 |
| 2006/0059462 A1 * | 3/2006 | Yamamoto | .......... | G06F 17/2247 |
| | | | | 717/115 |
| 2006/0136576 A1 * | 6/2006 | Ookuma | ................. | G06F 21/31 |
| | | | | 709/219 |
| 2008/0028438 A1 * | 1/2008 | Sakakibara | ........... | G06F 21/608 |
| | | | | 726/2 |

(Continued)

FOREIGN PATENT DOCUMENTS

JP 2006-178830 A 7/2006

*Primary Examiner* — Hadi Armouche
*Assistant Examiner* — Sher A Khan
(74) *Attorney, Agent, or Firm* — Canon U.S.A., Inc. IP Division

(57) ABSTRACT

An image forming apparatus controls the use of a remote user interface (RUI) by requesting authentication with an RUI access password from a client device in a case where the RUI access password is set. In a case of a department ID management setting, the security setting is different from the RUI access password setting. In this situation, the image forming apparatus requests authentication with the department ID, and then controls the use of the RUI based on the result of the authentication.

7 Claims, 9 Drawing Sheets

(56) References Cited

U.S. PATENT DOCUMENTS

| | | | |
|---|---|---|---|
| 2009/0147306 A1* | 6/2009 | Sugiyama | G06F 3/1222 358/1.15 |
| 2010/0208286 A1* | 8/2010 | Iwata | G06F 21/608 358/1.14 |
| 2012/0229838 A1* | 9/2012 | Mogaki | G06F 21/608 358/1.14 |
| 2012/0232970 A1* | 9/2012 | Kara | G07B 17/00024 705/14.4 |
| 2012/0250066 A1* | 10/2012 | Kikumoto | G06F 3/1222 358/1.14 |
| 2012/0250067 A1* | 10/2012 | Liu | G06F 21/34 358/1.14 |
| 2013/0003106 A1* | 1/2013 | Nishida | G06F 3/1222 358/1.14 |
| 2013/0044343 A1* | 2/2013 | Matsugashita | G06F 3/1222 358/1.14 |
| 2014/0240739 A1* | 8/2014 | Hattori | G06F 3/1219 358/1.13 |
| 2015/0067144 A1* | 3/2015 | Scovill | H04L 41/12 709/224 |

* cited by examiner

FIG. 4
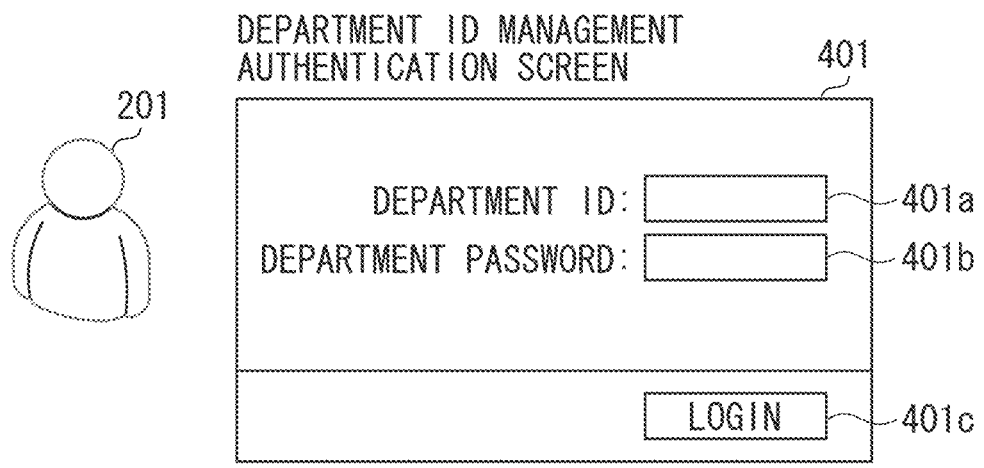
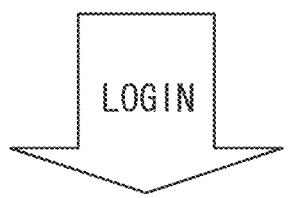
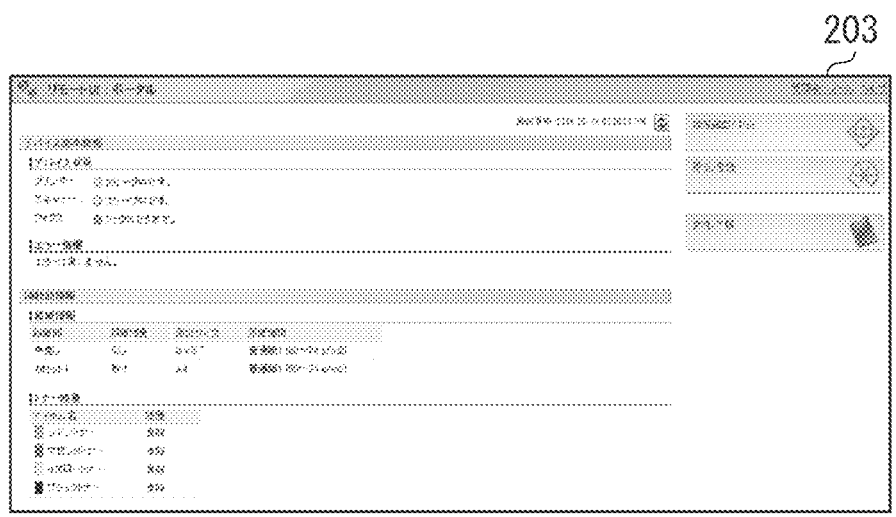

FIG. 6

| RUI-PERMISSION SETTING | DEPARTMENT ID MANAGEMENT SETTING | RUI ACCESS PASSWORD SETTING | DISPLAYED AUTHENTICATION SCREEN |
|---|---|---|---|
| ON | OFF | OFF | NORMAL AUTHENTICATION SCREEN 202 |
| ON | OFF | ON | RUI ACCESS AUTHENTICATION SCREEN 301 |
| ON | ON | NOT CONSIDERED | DEPARTMENT ID MANAGEMENT AUTHENTICATION SCREEN 401 |
| OFF | NOT CONSIDERED | NOT CONSIDERED | RUI-ACCESS-PROHIBITED SCREEN |

FIG. 7

```
RUI-PERMISSION SETTING                    700

RUI PERMISSION:        ● ON           700a
                           ○ OFF
```

```
DEPARTMENT ID MANAGEMENT SETTING          701

DEPARTMENT ID MANAGEMENT:  ● ON       701a
                               ○ OFF
```

```
SECURITY SETTING                          702

RUI ACCESS RESTRICTION:    ● ON       702a
                               ○ OFF

RUI ACCESS PASSWORD:   [         ]
                                          702b
    CONFIRM PASSWORD:      [         ]
```

FIG. 9

| RUI-PERMISSION SETTING | DEPARTMENT ID MANAGEMENT SETTING | RUI ACCESS PASSWORD SETTING | DISPLAYED AUTHENTICATION SCREEN |
|---|---|---|---|
| ON | OFF | OFF | NORMAL AUTHENTICATION SCREEN 202 |
| | | ON | RUI ACCESS AUTHENTICATION SCREEN 301 |
| | ON | NOT CONSIDERED | DEPARTMENT ID MANAGEMENT AUTHENTICATION SCREEN 401 |
| OFF | NOT CONSIDERED | NOT CONSIDERED | RUI-ACCESS-PROHIBITED SCREEN |

IMAGE PROCESSING APPARATUS, METHOD FOR CONTROLLING IMAGE PROCESSING APPARATUS, AND STORAGE MEDIUM

BACKGROUND

Field

Aspects of the present invention generally relate to an information processing apparatus that can be accessed by external devices.

Description of the Related Art

In recent years, with the advancement of imaging forming apparatus, a low-priced image forming apparatus has come to include network functions as standard. Opportunities of using such apparatus in a network environment have increased not only in large offices but in small offices and at home.

A Web browser running on a personal computer (PC) can display, via a network, statuses and settings of the image forming apparatus that is connected to the network. A user interface displayed on the Web browser is called a remote user interface (remote UI or RUI) while a user interface (UI) equipped in the image forming apparatus is called a local UI (LUI).

While large offices normally assign network administration staff or the like to implement security measures, the security measures in small offices or average households may not be sufficient. In a case where an image forming apparatus without sufficient security control is connected to the network, since an RUI can be accessed from external access and operated, a problem such as leakage of confidential information may occur.

Japanese Patent Application Laid-Open No. 2006-178830 discusses a technique for improving security in which secondary authentication is performed in addition to a normal one on an account that the account owner has not accessed for a long time (for example, an account of an employee on a long business trip or an employee who has left a company).

Image forming apparatuses conventionally have a capability to set a password that is used in authentication against external access via a network. Some image forming apparatuses have an access management function including a mode for setting a department identification (ID) and a password for identifying which department is accessing the image forming apparatus. In addition to such a function, in the mode of the department ID management, privileges to execute specific functions (for example, copying, sending a fax, and so on) can be restricted or the number of output or transmitted pages can be counted for each department ID.

In a case where the mode of department ID management is set, an image forming apparatus can be seen as protected with security measures. In this state, imposing additional authentication on the external access is redundant and hence undermines user convenience. Besides, such a problem is not limited to image forming apparatus alone, but exists in various other information processing apparatus that can communicate with external devices.

SUMMARY

Aspects of the present invention generally provide a device for maintaining security of information processing apparatus, including image forming apparatus, that can communicate with external devices without hampering user convenience.

According to an aspect of the present invention, an information processing apparatus includes a first setting unit configured to make a first setting enabling access restriction from an external device, a control unit configured to request authentication related to the first setting from the external device and to control the access based on a result of the authentication in a case where the first setting is made, and a second setting unit configured to make a second setting different from the first setting. In a case where the second setting is made, the control unit requests authentication related to the second setting from the external device without requesting the authentication related to the first setting and controls the access based on a result of the authentication related to the second setting in case where the second setting is made.

Further features and aspects of the present disclosure will become apparent from the following description of exemplary embodiments with reference to the attached drawings.

BRIEF DESCRIPTION OF THE DRAWINGS

FIG. 4 illustrates transition of screens of an RUI when department ID management setting is set according to the first exemplary embodiment.

FIG. 6 is a table for describing a relation between settings of the image forming apparatus and authentication screens of an RUI according to the first exemplary embodiment.

FIG. 7 illustrates exemplary setting screens according to the first exemplary embodiment.

FIG. 9 is a table for describing a relation between settings of the image forming apparatus and authentication screens of an RUI according to the second exemplary embodiment.

DESCRIPTION OF THE EMBODIMENTS

Described now will be exemplary embodiments with reference to the accompanying drawings.

Figure 1:
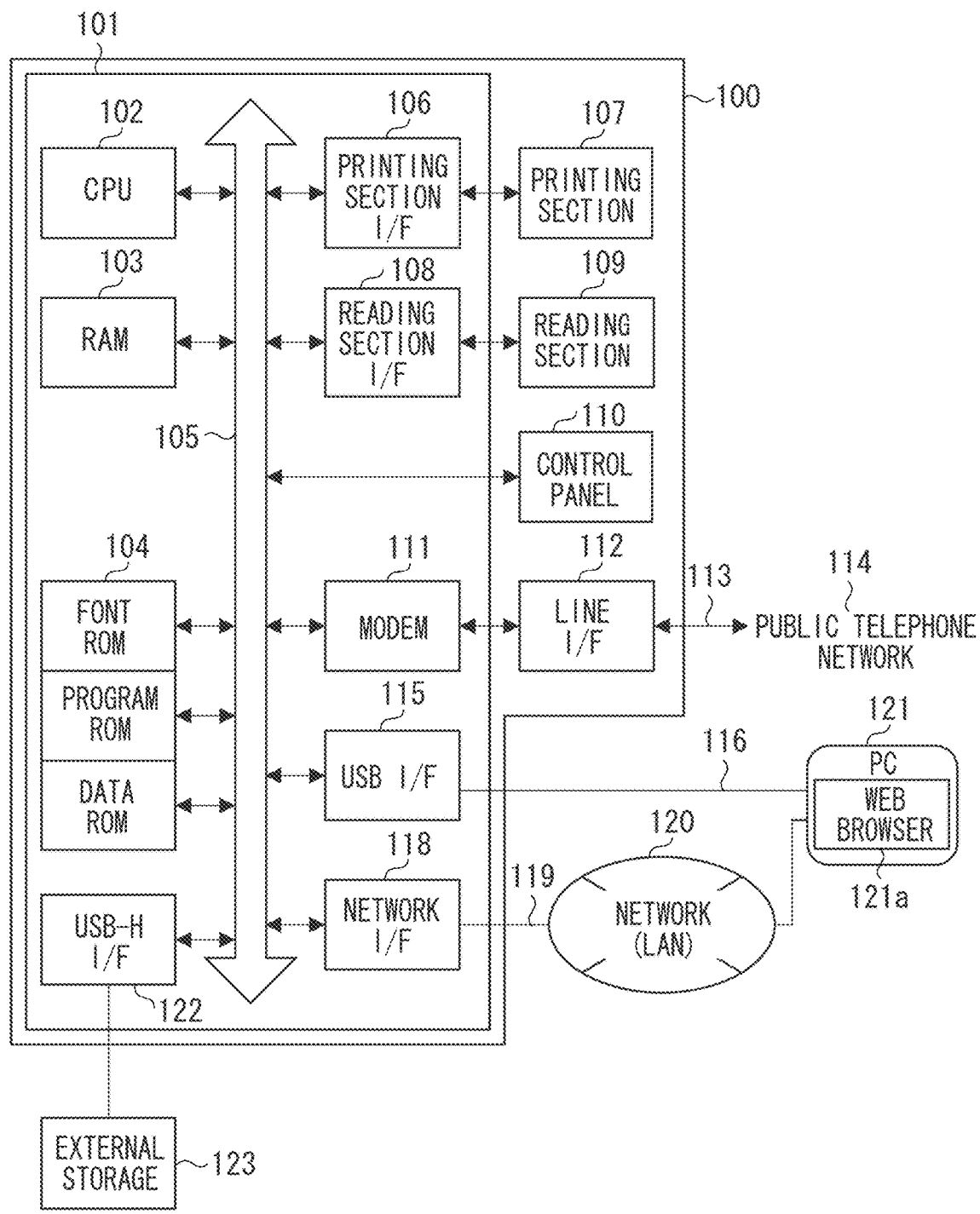
FIG. 1 is a block diagram for illustrating a hardware configuration of an image forming apparatus according to exemplary embodiments.

FIG. 1 is a block diagram for illustrating a hardware configuration of an image forming apparatus 100 according to an exemplary embodiment. Each block refers to a module and an arrow between blocks indicates a flow of data or a flow of instruction.

As shown in FIG. 1, an image forming apparatus 100 is a multifunction peripheral (MFP) that includes a printing section 107, a scanning section 109, a control panel 110, a line interface (I/F) 112, and a controller section 101 for controlling these sections. The image forming apparatus 100 is not limited to MFP, but can be a printer, a scanner, a facsimile machine or the like.

The controller section 101 includes a CPU 102, a RAM 103, a ROM 104, a printing section I/F 106, a scanning section I/F 108, a MODEM 111, a USB-D I/F 115, a network I/F 118, and a USB-H I/F 122, and each block is connected each other via a system bus 105.

The CPU 102 controls each of the blocks as a whole by executing various control programs. The CPU 102 executes the various control programs that are stored in a program area of the ROM 104 and are read out by the CPU 102. The various control programs may be compressed data stored in the program area of the ROM 104. The compressed data are transferred to the RAM 103, decompressed, and executed by the CPU 102. Further, the various control programs may be stored in a not-shown hard disk drive (HDD) in a compressed or not-compressed state.

The network I/F 118 performs processing for communication with a host computer via a network (LAN) 120. The host computer 121 is represented by PC in FIG. 1 and hereinafter referred to as a PC. The network I/F 118 is coupled to the network 120 by a communication cable such as a LAN cable 119. The PC 121 can be connected to the image forming apparatus 100 by a USB cable 116 via the USB-D I/F 115 as well. The network 120 may be a wireless network.

In addition, a Web browser 121a is operable in the PC 121 and the image forming apparatus 100 is accessible from the PC 121 by using the Web browser 121a or the like. The PC 121 is not limited to a personal computer but may be a tablet computer, a smart phone, or a similar device. A client program other than the Web browser 121a may be used to access the image forming apparatus 100 from the PC 121. An information processing apparatus according to an exemplary embodiment will be described based on a configuration in which the image forming apparatus 100 is accessed from the PC 121 by using the Web browser 121a. The information processing apparatus, however, is not limited to this configuration.

The MODEM 111, which is connected to a public telephone network 114 via the line I/F 112, performs processing for communication with another image forming apparatus, a facsimile machine, a telephone, etc. The line I/F 112 and the public telephone network 114 are coupled generally with a telephone line 113.

The USB-H I/F 122 is directly connected to an external storage 123.

The printing section I/F 106 is an interface for outputting image signals to the printing section 107 (printer engine). Further, the reading section I/F 108 is an interface for inputting readout image signals from the reading section 109 (scanner engine). The CPU 102 processes the input image signals from the reading I/F 108 and outputs them as recorded image signals to the printing I/F 106.

The CPU 102 displays characters and symbols using font information that are stored in a font area of the ROM 104 onto a display area of the control panel 110. The CPU 102 also receives instructions from the control panel 110 that a user operates.

Furthermore, the CPU 102 stores, in a data area of the ROM 104, device information of the image forming apparatus 100, information of user telephone directory, department management information, and other information. The CPU 102 reads out and updates the stored information when necessary.

The image forming apparatus 100 is configured to include the reading section 109 and the printing section 107 inside thereof as shown in the block diagram. The image forming apparatus 110, however, may be configured to include one or both of these sections outside thereof.

The image forming apparatus 100 can provide a user interface, i.e., a remote user interface (RUI), which is usable from an external device such as a PC 121. A user can access the image forming apparatus 100 from the Web browser 121a on the PC 121 via a network and can browse and change settings of the image forming apparatus 100 by using an RUI of the image forming apparatus 100.

Figure 2:
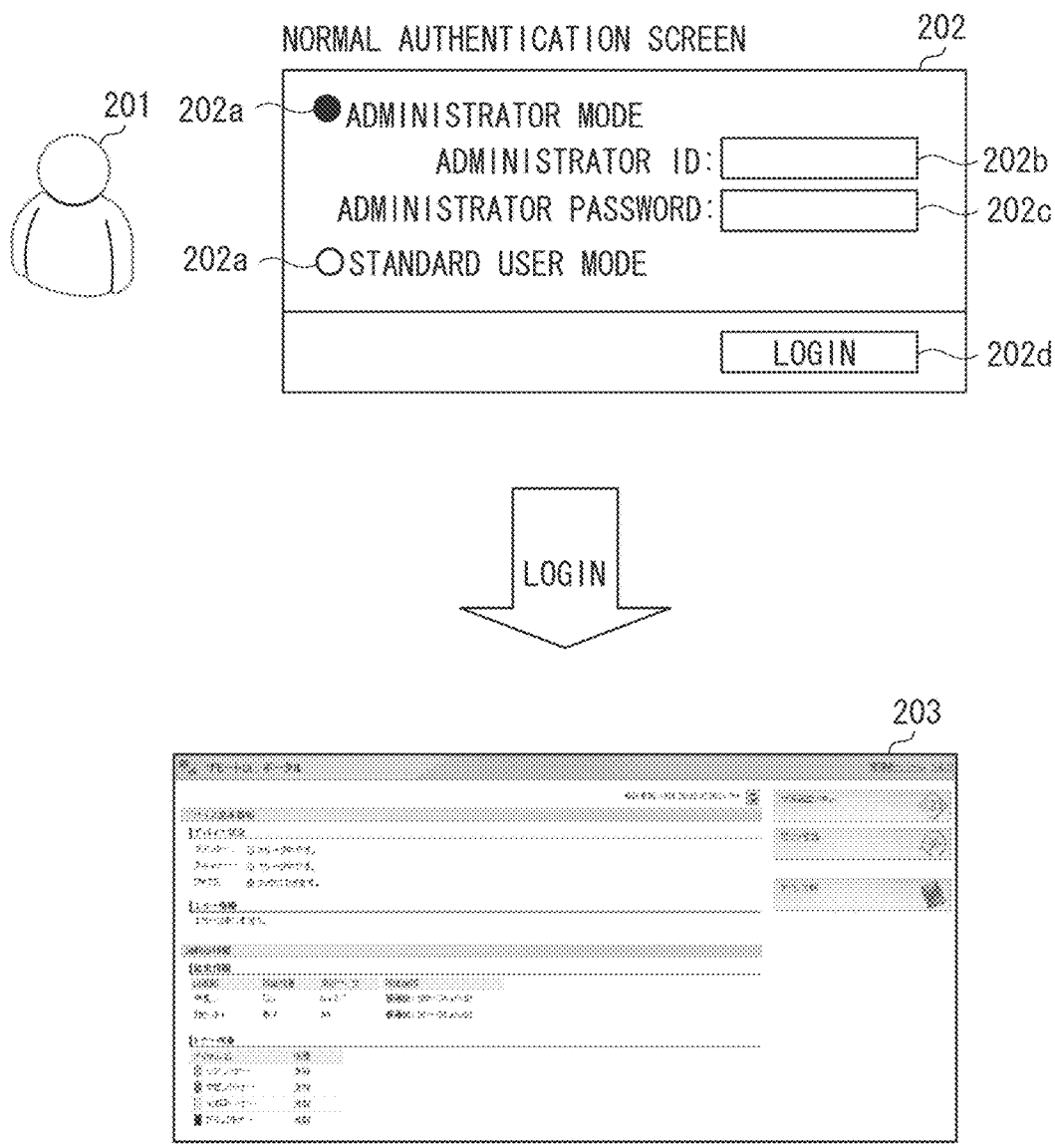
FIG. 2 illustrates transition of screens of an RUI during normal authentication according to a first exemplary embodiment.
Figure 3:
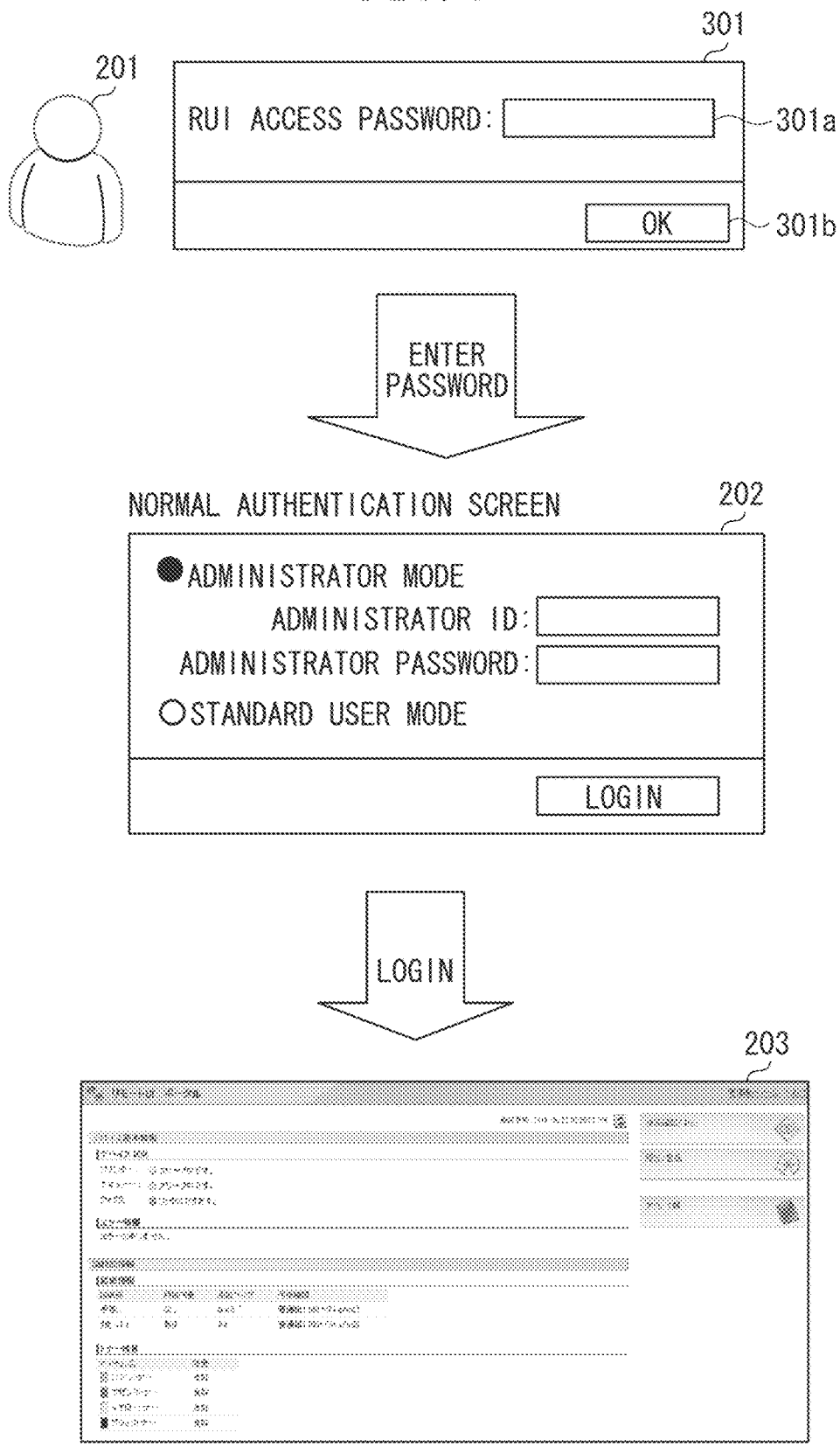
FIG. 3 illustrates transition of screens of an RUI when an RUI access password is entered according to the first exemplary embodiment.

Referring to FIGS. 2 to 4, transition of screens of an RUI according to the first exemplary embodiment will be illustrated below. An authentication screen appears when an RUI access password and a department ID management setting are not made. The authentication screen is hereafter referred to as a normal authentication screen 202.

FIG. 2 shows transition of screens of an RUI during normal authentication according to the first exemplary embodiment.

When an RUI access password and a department ID management setting are not set, if the PC 121 accesses the image forming apparatus 100, then the normal authentication screen 202 appears on a display of the PC 121. A user 201 selects either an administrator mode or a standard user mode as a log-in mode by operating a radio button 202a on the normal authentication screen 202 that is displayed on the display of the PC 121 by the Web browser 121a or the like running on the PC 121. The user 201 then presses a log-in button 202d.

If the log-in mode that is selected with the radio button 202a is the administrator mode, an administrator ID and an administrator password must be properly entered in an administrator ID entry field 202b and an administrator password entry field 202c respectively. In contrast, if the log-in mode is the standard user mode, there will be no further authentication required. In this case, it is not necessary to enter the administrator ID in the administrator ID entry field 202b and the administrator password in the administrator password entry field 202c.

When the authentication is properly processed in the normal authentication careen 202, a top screen 203 of an RUI will be displayed (i.e., screen transitions), which will enable the user 201 to access the RUI.

FIG. 3 illustrates transition of screens of an RUI when an RUI access password is entered according to the first exemplary embodiment. In FIG. 3, the same reference numerals are used for the items that are identical to those in FIG. 2 with no further description.

In a case where external accesses are restricted, when a user 201 accesses the image forming apparatus 100 from the PC 121, an RUI access password input screen 301 appears on the display of the PC 121. The RUI access password input screen 301 is a screen for performing authentication with the RUI access password (RUI access authentication screen).

A user 201 enters a preset password into an RUI access password entry field 301a on the RUI access password input screen 301 that is displayed on the display of the PC 121 by the Web browser 121a or the like running on the PC 121. The user 201 then press an OK button 301b. If the entered RUI access password is correct, the normal authentication screen 202 will appear (i.e., screen transitions) and, with the same sequence as described with FIG. 2, the RUI top screen 203 will be displayed, which will enable the user 201 to access RUI.

FIG. 4 illustrates transition of screens of RUI when department ID management setting is set according to the first exemplary embodiment. In FIG. 4, the same reference numerals are used for the items that are identical to those in FIG. 2 with no further description.

In a case where the department ID management setting is made, if a user 201 accesses the image forming apparatus 100 from the PC 121, a department ID management authentication screen 401 appears on the display of the PC 121.

A user 201 enters a department ID and a department password, which are allocated to the department in which the user 201 is registered, into a department ID entry field 401a and a department password entry field 401b respectively on the department ID management authentication screen 401. The authentication screen 401 is displayed on the display of the PC 121 by the Web browser 121a or the like running on the PC 121. The user 201 then presses a log-in button 401c. If the entered department ID and department password are correct, the RUI top screen 203 will appear (i.e., screen transitions), which will enable the user 201 to access the RUI.

Figure 5:
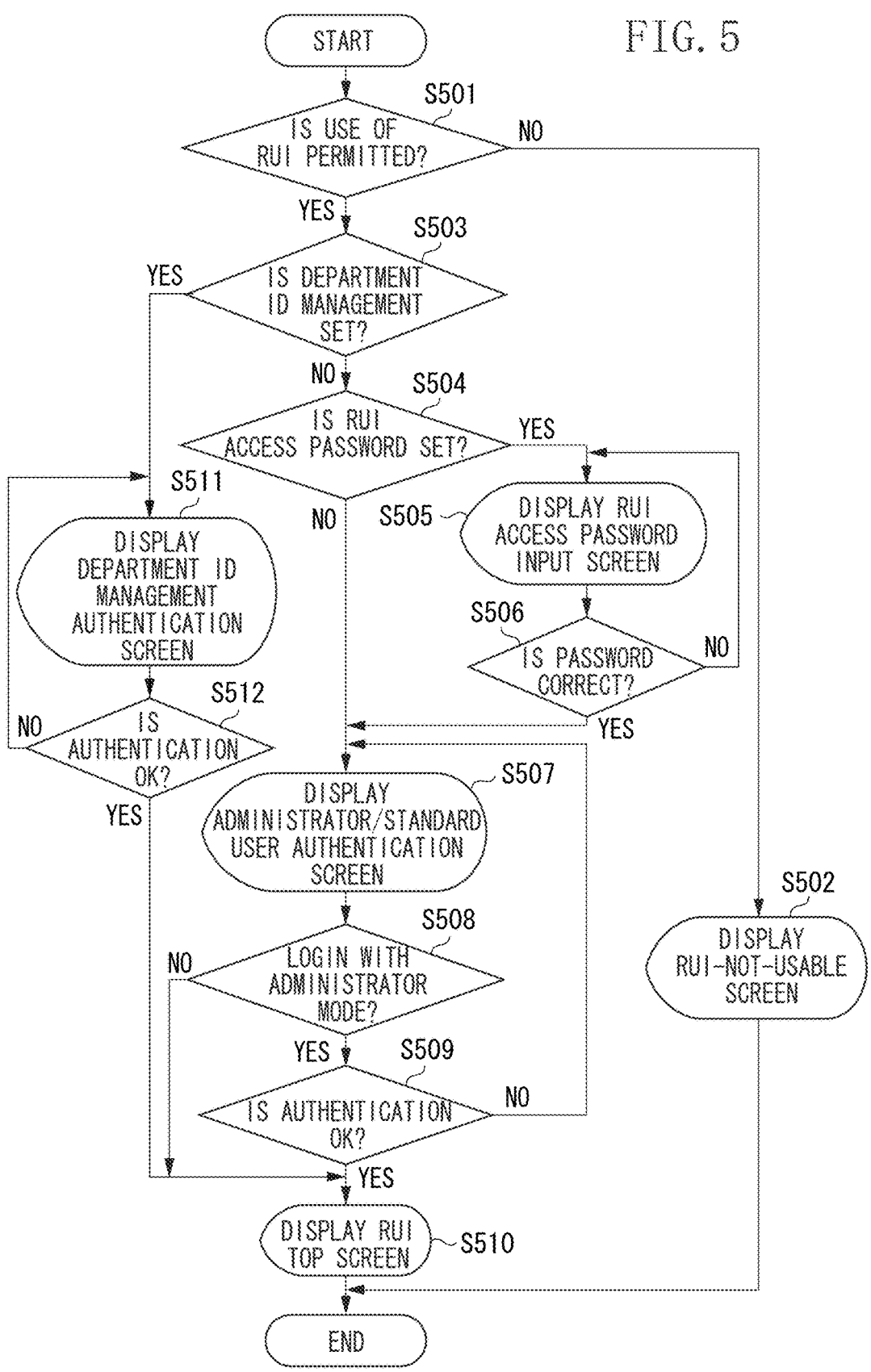
FIG. 5 is an exemplary flowchart for depicting a process for displaying an RUI authentication screen according to the first exemplary embodiment.

FIG. 5 is an exemplary flowchart for depicting a process for displaying an RUI authentication screen according to the first exemplary embodiment. The CPU 102 is to implement each step of the flowchart by reading out and executing programs stored in the ROM 104.

When the image forming apparatus 100 receives a remote access request sent by the Web browser 121a that is running on the PC 121, the CPU 102 starts processing according to the flowchart. In the flowchart, a process which expressly indicates no operating entity is carried out by the CPU 102.

Now in step S501, the CPU 102 confirms whether the use of the RUI itself is permitted. If it is determined in the mentioned step S501 that the use of the RUI is not permitted (i.e., RUI-permission setting in FIGS. 6 and 7 is OFF, which will be described later), the CPU 102 advances the processing to step S502 (in case of NO in step S501).

In step S502, the CPU 102 controls the processing to display an RUI-not-usable screen (i.e., a not-shown message screen to inform that the use of the RUI is not permitted). More particularly, the CPU 102 transmits display data of the RUI-not-usable screen to the Web browser 121a that is running on the PC 121. The Web browser 121a displays, based on the received display data, the RUI-not-usable screen on the display of the PC 121. Upon completing the processing in step S502, the CPU 102 ends the process.

If it is determined in step S501 that the use of the RUI is permitted (i.e., RUI-permission setting is ON), the CPU 102 advances the processing to step S503 (i.e., in case of YES in step S501).

In step S503, the CPU 102 determines whether the department ID management setting is set. If it is determined that the department ID management setting is not set (i.e., the department ID management setting in FIGS. 6 and 7 is OFF, which will be described later), the CPU 102 advances the processing to step S504 (i.e., in case of NO in step S503).

In step S504, the CPU 102 determines whether an RUI access password is set. If it is determined that the RUI access password is set (i.e., the RUI access password setting in FIGS. 6 and 7 is set ON, which will be described later), the CPU 102 advances the processing to step S505 (i.e., in case of YES in step S504).

In step S505, the CPU 102 controls the processing to display an RUI access password input screen 301. More particularly, the CPU 102 transmits display data of the RUI access password input screen 301 to the Web browser 121a running on the PC 121. When the Web browser 121a receives the display data, the Web browser 121a displays, based on the display data, the RUI access password input screen 301 on the display of the PC 121.

When the CPU 102 receives, from the Web browser 121a running on the PC 121, an RUI access password that the user 201 has entered on the RUI access password input screen 301, the CPU 102 advances the processing to step S506.

In step S506, the CPU 102 determines whether the RUI access password that the user 201 has entered is correct (i.e., the entered password agrees with the RUI access password previously registered). In other words, the CPU 102 performs authentication processing with the RUI access password and checks the authentication result.

If the CPU 102 determines that the RUI access password that the user 201 has entered is not correct (i.e., NO in step S506), the CPU 102 controls the processing to display the RUI access password input screen 301 again (in step S505).

If the CPU 102 determines, in step S506, that the RUI access password that the user 201 has entered is correct (i.e., YES in the step S506), the CPU 102 advances the processing to step S507.

In step S507, the CPU 102 controls the processing to display the normal authentication screen 202. More particularly, the CPU 102 transmits display data of the normal authentication screen 202 to the Web browser 121a that is running on the PC 121. When the Web browser 121a receives the display data, the Web browser 121a displays, based on the display data, the normal authentication screen 202 on the display of the PC 121.

The CPU 102 also controls the processing to display the normal authentication screen 202 (in step S507), in a case where the CPU 102 determines, in step S504, that the RUI access password is not set (i.e., the RUI access password setting is OFF; in case of NO in step S504).

When the CPU 102 receives, from the Web browser 121a running on the PC 121, information including a log-in mode that the user 201 has selected in the normal authentication screen 202, the CPU 102 advances the processing to step S508.

In step S508, the CPU 102 determines whether the log-in mode that the user 201 has selected is the administrator mode (i.e., the user 201 has logged in the administrator mode).

If the CPU 102 determines that the log-in mode that the user 201 has selected is the administrator mode (i.e., the user 201 has logged in with the administrator mode), the CPU 102 advances the processing to step S509 (i.e., in case of YES in S508).

In step S509, the CPU 102 performs authentication processing for the administrator mode based on an administrator ID and an administrator authentication password that have been received along with the information on the log-in mode. The CPU subsequently determines the authentication result.

If the CPU 102 determines that the authentication fails (i.e., NO in S509), the CPU 102 controls the processing to display the normal authentication screen 202 again (in step S507).

If the CPU 102 determines that the authentication is successful (i.e., authentication is OK), the CPU 102 controls the processing to display the RUI top screen 203 (i.e., in case of YES in step S509). More particularly, the CPU 102 transmits display data of the RUI top screen 203 to the Web browser 121a that is running on the PC 121. When the Web browser 121a receives the display data, the Web browser 121a displays, based on the display data, the RUI top screen 203 on the display of the PC 121.

If the CPU 102 determines that the log-in mode that the user 201 has selected in step S508 is the standard user mode (i.e., in case of NO in step S508), the CPU 102 controls the processing to display the RUI top screen 203 without performing authentication (in step S510).

If the CPU 102 determines, in step S503, that the department ID management setting is set (i.e., the department ID management setting is ON), the CPU 102 advances the processing to step S511 (i.e., in case of YES in step S503). In step S511, the CPU 102 controls the processing to display the department ID management authentication screen 401. More particularly, the CPU 102 transmits display data of the department ID management authentication screen 401 to the Web browser 121*a* that is running on the PC 121. When the Web browser 121*a* receives the display data, the Web browser 121*a* displays, based on the display data, the department ID management authentication screen 401 on the display of the PC 121.

When the CPU 102 receives, from the Web browser 121*a* running on the PC 121, a department ID and a password that the user 201 has entered in the department ID management authentication screen 401, the CPU 102 advances the processing to step S512.

In step S512, the CPU 102 performs authentication processing with the department ID and the password that the user 201 has entered and determines the authentication result.

If the CPU 102 determines that the authentication has failed (i.e., NO in S512), the CPU 102 controls the processing to display the department ID management authentication screen 401 again (in step S511).

If the CPU 102 determines that the authentication is successful (i.e., authentication is OK), the CPU 102 controls the processing to display the RUI top screen 203 in step S510 (i.e., in case of YES in step S512). Upon completing the processing in step S510, the CPU 102 ends the process.

FIG. 6 is a table for depicting a relationship between settings of the image forming apparatus and displayed authentication screens of the RUI according to the first exemplary embodiment.

FIG. 7 shows exemplary setting screens for RUI-permission setting, department ID management setting, and RUI access password setting according to the first exemplary embodiment.

Whether it is permitted to use an RUI is set in an RUI-permission setting screen 700 by selecting ON/OFF of a radio button 700*a*.

Whether the department ID management is implemented is set in a department ID management setting screen 701 by selecting ON/OFF of a radio button 701*a*. In a case where the department ID management setting is set, the CPU 102 manages authentication to permit each individual department (i.e., individual user group) to access the image forming apparatus 100.

Whether access to an RUI is to be restricted is set by selecting ON/OFF of a radio button 702*a* on a security setting screen 702. In an RUI access password entry field 702*b*, an RUI access password is set when RUI access restriction is set on the security setting screen 702.

Thus, the use of an RUI can be restricted in the security setting screen 702 by means of password information (i.e., the RUI access password set in 702*a*).

The values that are set in the RUI-permission setting screen 700, the department ID management setting screen 701, and the security setting screen 702 are stored in the data area of the ROM 104 under the control of the CPU 102. The ROM 104 consists of flash ROMs in which data can be overwritten.

Further, the RUI-permission setting screen 700, the department ID management setting screen 701, and the security setting screen 702 are also displayed in a display area of the control panel 110 under the control of the CPU 102. In the example illustrated in FIG. 7, radio buttons (700*a*, 701*a*, 702*a*) are used to select presence or non-presence of permission, restriction, and management, on the RUI-permission setting screen 700, the department ID management setting screen 701, and the security setting screen 702. Other selection methods, such as dropdown lists, can be used in place of the radio buttons.

Returning to FIG. 6, when the RUI-permission setting is OFF, the RUI-access-prohibited screen is displayed on the display of the PC 121 and access from the PC 121 is prohibited, regardless of ON/OFF of the department ID management setting and the RUI access password setting. Further, when the RUI-permission setting is ON, if the department ID management setting is ON, the department ID management authentication screen 401 is displayed on the display of the PC 121, and access from PC 121 is controlled and permitted with the authentication using a department ID and a department password, regardless of ON/OFF of the RUI access password setting.

When the RUI-permission setting is ON and the department ID management setting is ON, if the RUI access password setting is ON, the RUI access password input screen 301 is displayed on the display of the PC 121, and the access from PC 121 is controlled and permitted using the authentication with the RUI access password.

Further, when the RUI-permission setting is ON and the department ID management setting is OFF, if the RUI access password setting is OFF, the normal authentication screen 202 is displayed on the display of the PC 121.

As shown in FIG. 6, if the department ID management is set ON on the department ID management setting screen 701, the RUI access password input screen 301 is not displayed at the time of a remote access request regardless of the RUI access restriction setting, according to the first exemplary embodiment. Therefore, if the department ID management is ON, the RUI access restriction setting and the entry of RUI access password on the security setting screen 702 are not applicable. Accordingly, the RUI access restriction setting and the RUI access password entry fields can be grayed out under the control of the CPU 102 to prevent user's entry.

In the same way, if the RUI-permission setting is OFF on the RUI-permission setting screen 700, the RUI access restriction setting and the RUI access password entry fields may be grayed out under the control of the CPU 102 to prevent user's entry.

As explained in the foregoing, if an image forming apparatus according to the first exemplary embodiment is configured such that access to the image forming apparatus via a network is enabled with authentication using an external access password (i.e., RUI access password) in a case where the external access password is set, and if such an image forming apparatus operates in a mode in which the department ID management is set (i.e., department ID management is ON), access via a network is enabled with authentication using a department ID and a department password registered in the department ID management without further authentication using the external access password regardless of ON/OFF of the external access password setting. Accordingly, when a security measure (e.g., the department ID management setting) other than authentication using an external access password is implemented, redundancy of further authentication with such external access password that will be imposed on a user can be eliminated. Consequently, an image forming apparatus that can maintain security without hampering user convenience is provided.

In the first exemplary embodiment described above, whether access to an RUI is restricted is controlled by ON/OFF of the RUI access password setting in a case where the department ID management setting is not made in the image forming apparatus 100. Alternatively, in a case where a system administrator's privileges are properly set, a user having user mode privileges can access an RUI but cannot change settings of the image forming apparatus 100 and therefore it is not likely to cause a problem. Accordingly, whether access to an RUI is restricted may be configured to depend on ON/OFF of the system administrator setting. This configuration will be further explained in a second exemplary embodiment hereafter by only describing differences between the first and the second exemplary embodiments.

Figure 8:
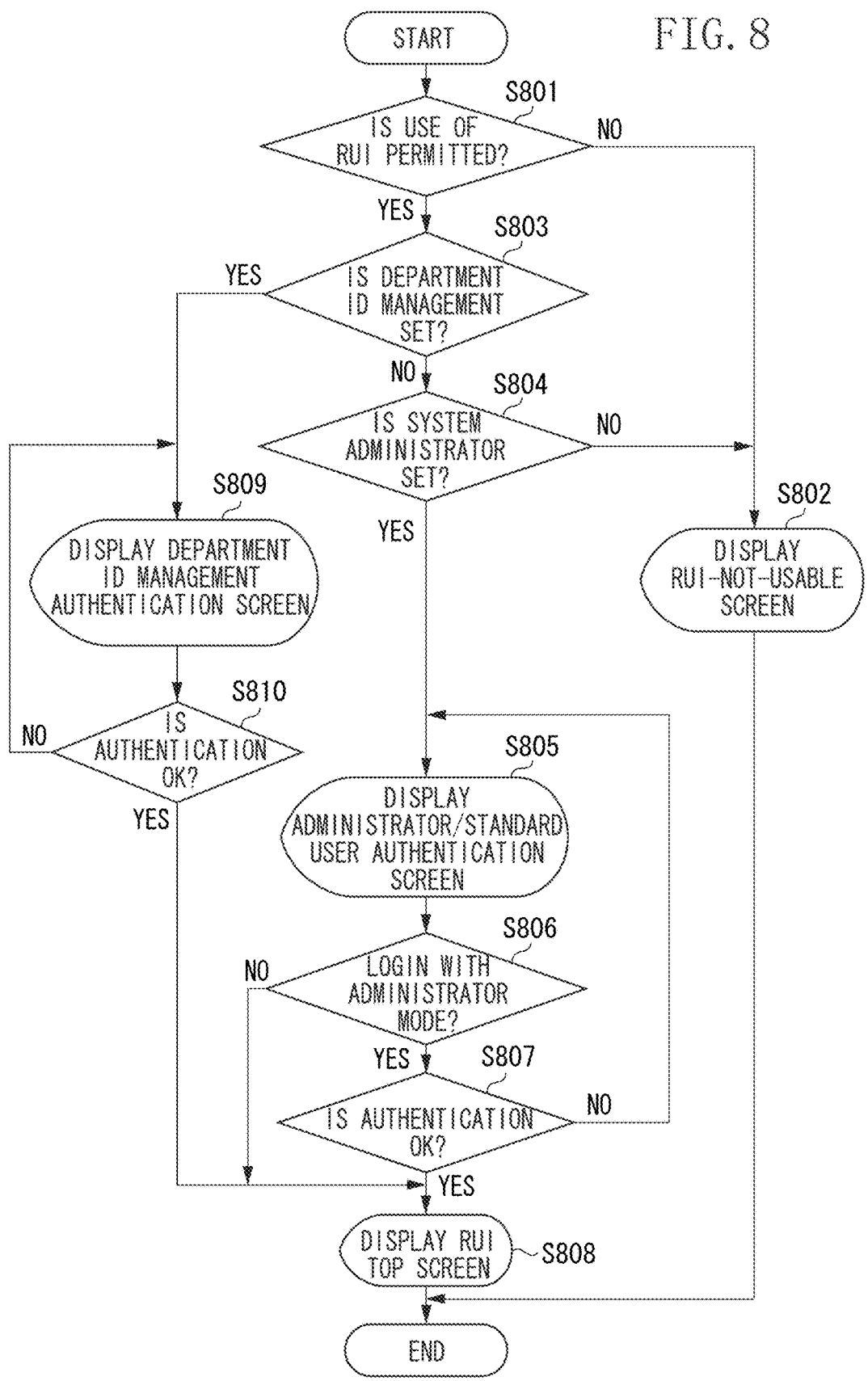
FIG. 8 is an exemplary flowchart for depicting a process for displaying an RUI authentication screen according to a second exemplary embodiment.

FIG. 8 is an exemplary flowchart for depicting a process for displaying an RUI authentication screen according to the second exemplary embodiment. The CPU 102 implements each step of the flowchart by reading out and executing programs stored in the ROM 104.

When the image forming apparatus 100 receives a remote access request sent by the Web browser 121a that is running on the PC 121, the CPU 102 starts processing according to the flowchart. In the flowchart, a process that does not expressly indicate its operating entity is implemented by the CPU 102.

Steps S801 to S803 and steps S809 to S810 are the same as steps S501 to S503 and steps S511 to S512 in FIG. 5 respectively, therefore a description of which will not be repeated.

In step S803, however, if it is determined that the department ID management setting is not set (i.e., NO in step S803), the CPU 102 advances the processing to step S804.

In step S804, the CPU 102 determines whether a system administrator setting is made. The system administrator setting is a setting whereby a specific user or department (i.e., a user group) is designated as an administrator and given administrator privileges over the image forming apparatus 100. The administrator privileges, for example, enable all types of access to the image forming apparatus 100.

If the CPU 102 determines that the system administrator is not designated (i.e., the system administrator setting is OFF in FIG. 9, which will be described later; (NO in S804)), the CPU 102 controls the processing to display an RUI-not-usable screen in step S802 (a message screen (not illustrated) to inform that the use of the RUI is not permitted). Step S802 is the same as step S502 in FIG. 5, therefore a description of which will not be repeated.

On the other hand, if the CPU 102 determines that the system administrator is designated (i.e., the system administrator setting is ON) in step S804 (YES in step S804), the CPU 102 advances the processing to steps S805 to S808. Steps S805 to S808 are the same as steps S507 to S510 in FIG. 5, therefore a description of which will not be repeated.

FIG. 9 is a table for depicting a relationship between settings of the image forming apparatus and displayed authentication screens of an RUI according to the second exemplary embodiment. Only differences from FIG. 6 shown in the first exemplary embodiment will be described.

The same cases that are the same as in the first exemplary embodiment are the RUI-permission setting is OFF and that the RUI-permission setting is ON and the department ID management setting is ON. Therefore, description on this will not be repeated.

When the RUI-permission setting is ON and the department ID management setting is OFF, if the system administrator setting is ON, then the normal authentication screen 202 is displayed on the display of the PC 121. When the RUI-permission setting is ON and the department ID management setting is OFF, if the system administrator setting is OFF, then the RUI-access-prohibited screen is displayed on the display of the PC 121 and access from the PC 121 is prohibited.

As explained in the foregoing, an image forming apparatus according to the second exemplary embodiment is configured such that access to an RUI via a network is enabled when the system administrator setting is set, and access to an RUI via a network is disabled when the system administrator setting is not set, and that if such image forming apparatus operates in a mode in which the department ID management is set (i.e., department ID management setting is ON), access via a network is enabled with authentication using a department ID and a department password registered in the department ID management, without further authentication using an administrator ID and an administrator password of the system administrator, regardless of ON/OFF of the system administrator setting. Accordingly, when a security measure (e.g., the department ID management setting) other than authentication with an administrator ID is implemented, redundancy of further authentication using such administrator ID and administrator password which will be imposed on a user can be eliminated. Consequently, an image forming apparatus that can maintain security without hampering user convenience is provided.

In the foregoing, the authentication setting (the department ID management setting) for controlling access by each individual user group to the image forming apparatus 100 is implemented as a security measure other than the authentication with the RUI access password in the first exemplary embodiment or the authentication with the administrator authentication information in the second exemplary embodiment. However, the security measure other than the authentication with the RUI access password or the administrator authentication with the authentication information is not limited to such an exemplary embodiment.

For example, there may be a case in which authentication setting is made so as to control access by each individual to the image forming apparatus 100 (user ID management setting). When there is an RUI-access request from a PC 121 in a state that the user ID management setting is set, the CPU 102 controls the processing to display a user ID management authentication screen that requests a user ID and a user ID password from a user. More particularly, the CPU 102 transmits display data of the user ID management authentication screen to the Web browser 121a that is running on the PC 121. When the Web browser 121a receives the display data, the Web browser 121a displays, based on the display data, the user ID management authentication screen on the display of the PC 121. When the CPU 102 receives a user ID and a password that the user has entered on the user ID management authentication screen, the CPU 102 performs authentication processing with the user ID and the password. If the CPU 102 determines that the authentication fails, the CPU 102 controls the processing to display the user ID management authentication screen again. On the other hand, if the CPU 102 determines that the authentication is successful (i.e., authentication is OK), the CPU 102 controls the processing to display the RUI top screen 203.

In addition, the RUI of the image forming apparatus 100 in each exemplary embodiment described above may be accessible from the PC 121 via a network 120 or via an interface, such as a USB cable 116, other than the network 120.

Further, the access control has been described in a case where the image forming apparatus 100 in each of above-described exemplary embodiments provides a user interface (RUI) that is usable by an external device such as the PC 121. The access control may be applied to any access other than an RUI as long as it is an access to a function that the image forming apparatus 100 can provide.

Still further, aspects of the present invention have been described in relation to an image forming apparatus that is accessible from external devices including the PC 121. Aspects of the present invention, however, are not limited to the image forming apparatus but may apply to an information processing apparatus other than the image forming apparatus such as personal computers, networked home appliances and so forth. Aspects of the present invention can apply to any information processing apparatus as long as it can provide functions that are usable and accessible from external devices.

As has been described in the foregoing, when a security measure (e.g., the department ID management setting) other than authentication with an access password or an administrator password is implemented, the above-described configuration will eliminate redundancy of further authentication with the access password or the administrator password which is imposed on a user. Accordingly, an image forming apparatus and the like that can maintain security without hampering user convenience can be provided. Consequently, according to aspects of the present invention, security of information processing apparatus including image forming apparatus that are accessible via a network can be maintained without hampering user convenience.

Other Embodiments

Additional embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2014-161623, filed Aug. 7, 2014, which is hereby incorporated by reference herein in its entirety.

What is claimed is:

1. An image processing apparatus having a remote access function of providing web contents including at least status information on the image processing apparatus to an external apparatus via a network, the image processing apparatus comprising:

at least one hardware processor which acts as:
a first setting unit configured to set password information for executing access restriction to the web contents including at least the status information on the image processing apparatus, wherein the password information has no dependency relation with information for identifying a user and a department that use a resource of the image processing apparatus;
a second setting unit configured to set whether to enable a department management function of identifying a department that uses a resource of the image processing apparatus, wherein in a case where to enable the department management function is set, different authority to execute an image processing function of the image processing apparatus is assignable to each department identified based on at least a department identification for identifying a department, and a number of times of using the image processing function is counted for each identified department;
a control unit configured to, in a case where not to enable the department management function is set by the second setting unit, request the external apparatus that has requested the web contents to input a password for accessing the remote access function, and control whether to permit access to the web contents including the status information based on whether the password received from the external apparatus matches the password information for executing access restriction to the web contents, wherein the received password has no dependency relation with the information for identifying a user and a department that use a resource of the image processing apparatus, and
in a case where to enable the department management function is set by the second setting unit, request the external apparatus that has requested the web contents to input authentication information on the department management function without requesting the external apparatus to input the password for accessing the remote access function, and control whether to permit access to the web contents including the status information based on the authentication information received from the external apparatus, wherein the received authentication information includes at least a department identification;
a providing unit configured to provide a top screen of the remote access function to the external apparatus according to the control unit having permitted access to the web contents including the status information; and
a determination unit configured to determine whether to permit access to the web contents including the status information, wherein upon condition that the received password matches the password information, the determination unit determines to permit access to the web contents including the status information, and wherein in a case where not to enable the department management function is set by the second setting unit, the control unit permits access from the external device to the web contents including the status information if the determination unit determines to permit access to the web contents including the status information.

2. The image processing apparatus according to claim 1, wherein the at least one hardware processor further acts as:

a third setting unit configured to set whether to execute access control to the remote access function to use the password, wherein in a case where to execute access control to the remote access function to use the password is set by the third setting unit, the control unit permits access from the external device to the web contents including the status information according to the received password having matched the password information.

3. The image processing apparatus according to claim 2, wherein in a case where not to enable the department management function is set by the second setting unit and not to execute the access control to the remote access function is set by the third setting unit, the control unit permits the access to the web contents including the status information without requesting the external apparatus that has requested the web contents to make an input about access control.

4. The image processing apparatus according to claim 2, wherein the at least one hardware processor further acts as:

a fourth setting unit configured to set whether to use the remote access function, wherein the control unit does not permit, in case where the third setting is made, access regardless of whether the first setting or the second setting is made.

5. The image processing apparatus according to claim 1, wherein the image processing apparatus is an image forming apparatus.

6. A control method for an image processing apparatus having a remote access function of providing web contents including at least status information on the image processing apparatus to an external apparatus via a network, the control method comprising:

setting password information for executing access restriction to the web contents including at least the status information on the image processing apparatus, wherein the password information has no dependency relation with information for identifying a user and a department that use a resource of the image processing apparatus;

setting whether to enable a department management function of identifying a department that uses a resource of the image processing apparatus, wherein in a case where to enable the department management function is set, different authority to execute an image processing function of the image processing apparatus is assignable to each department identified based on at least a department identification for identifying a department, and a number of times of using the image processing function is counted for each identified department;

in a case where not to enable the department management function is set, requesting the external apparatus that has requested the web contents to input a password for accessing the remote access function, and controlling whether to permit access to the web contents including the status information based on whether the password received from the external apparatus matches the password information for executing access restriction to the web contents, wherein the received password has no dependency relation with the information for identifying a user and a department that use a resource of the image processing apparatus;

in a case where to enable the department management function is set, requesting the external apparatus that has requested the web contents to input authentication information on the department management function without requesting the external apparatus to input the password for accessing the remote access function, and controlling whether to permit access to the web contents including the status information based on the authentication information received from the external apparatus, wherein the received authentication information includes at least a department identification;

providing a top screen of the remote access function to the external apparatus according to the controlling having permitted the access to the web contents including the status information; and determining whether to permit access to the web contents including the status information, wherein upon condition that the received password matches the password information, the determining determines to permit access to the web contents including the status information, and wherein in a case where not to enable the department management function is set, controlling to permit access from the external device to the web contents including the status information if the determining determines to permit access to the web contents including the status information.

7. A non-transitory computer readable storage medium storing computer executable instructions causing a computer to implement a control method for an image processing apparatus having a remote access function of providing web contents including at least status information on the image processing apparatus to an external apparatus via a network, the control method comprising:

setting password information for executing access restriction to the web contents including at least the status information on the image processing apparatus, wherein the password information has no dependency relation with information for identifying a user and a department that use a resource of the image processing apparatus;

setting whether to enable a department management function of identifying a department that uses a resource of the image processing apparatus, wherein in a case where to enable the department management function is set, different authority to execute an image processing function of the image processing apparatus is assignable to each department identified based on at least a department identification for identifying a department, and a number of times of using the image processing function is counted for each identified department;

in a case where not to enable the department management function is set, requesting the external apparatus that has requested the web contents to input a password for accessing the remote access function, and controlling whether to permit access to the web contents including the status information based on whether the password received from the external apparatus matches the password information for executing access restriction to the web contents, wherein the received password has no dependency relation with the information for identifying a user and a department that use a resource of the image processing apparatus;

in a case where to enable the department management function is set, requesting the external apparatus that has requested the web contents to input authentication information on the department management function without requesting the external apparatus to input the password for accessing the remote access function, and controlling whether to permit access to the web contents including the status information based on the authentication information received from the external apparatus, wherein the received authentication information includes at least a department identification;

providing a top screen of the remote access function to the external apparatus according to the controlling having permitted the access to the web contents including the status information; and determining whether to permit access to the web contents including the status information, wherein upon condition that the received password matches the password information, the determining determines to permit access to the web contents including the status information, and wherein in a case where not to enable the department management function is set, controlling to permit access from the external device to the web contents including the status information if the determining determines to permit access to the web contents including the status information.

* * * * *